(No Model.)

A. T. HUFF.
Nut for Screw Bolt.

No. 228,816. Patented June 15, 1880.

Witnesses
Nat. E. Oliphant
Geo. R. Porter

Inventor
Abraham T Huff
per Chas H Fowler,
Attorney

UNITED STATES PATENT OFFICE.

ABRAHAM T. HUFF, OF NESHANIC, NEW JERSEY.

NUT FOR SCREW-BOLTS.

SPECIFICATION forming part of Letters Patent No. 228,816, dated June 15, 1880.

Application filed March 29, 1880. (No model.)

*To all whom it may concern:*

Be it known that I, ABRAHAM T. HUFF, a citizen of the United States, residing at Neshanic, in the county of Somerset and State of New Jersey, have invented certain new and useful Improvements in Nuts for Screw-Bolts; and I do hereby declare that the following is a full, clear, and exact description of the same, reference being had to the annexed drawings, making a part of this specification, and to the letters and figures of reference marked thereon.

Figure 1:
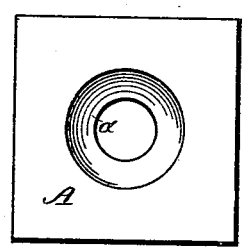
Figure 2:
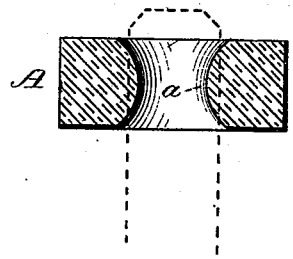
Figure 3:
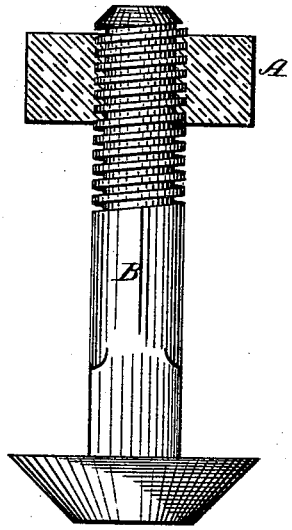

Figure 1 of the drawings is a plan view of my invention; Fig. 2, a cross-section; and Fig. 3, a similar view of the nut, showing it connected to a screw-bolt.

This invention has relation to rubber or other elastic nuts to be used on metallic screw-bolts; and it consists of a nut composed in part or wholly of rubber or other elastic material, having a convex surface around the opening for the screw-bolt.

In the accompanying drawings, A represents the nut, and B a metallic screw-bolt of the ordinary construction. The nut A is composed, in part or wholly, of elastic material, such as rubber, and is formed with an opening for the reception of the screw-threaded end of the bolt B.

The nut around the opening has a convex surface, *a*, leaving the diameter of the opening at its outer edges or faces of the nut greater than the smallest diameter. Owing to the convexity *a*, a bolt is used whose diameter is greater than the smallest diameter of the opening in the nut, thereby the more thoroughly compressing the elastic material into the metallic thread of the bolt and around the same, thereby increasing its friction and causing the nut to adhere more firmly.

The convexity of the elastic material surrounding the opening in the nut will admit of the nut being made of more solid and partially elastic material, as the form of the entrance of the opening allows the nut to engage more easily with the thread upon the bolt, and after thus engaging with it the space resulting from the difference in diameter between the bolt and the greatest diameter of the opening in the nut at both its outer edges or faces gives place to the material as it is being compressed by the entering of the metallic bolt, thereby preventing and keeping the material from being forced out on the surface or faces of the nut, as is common with elastic nuts having cylindrical or conical openings.

If desired, the elastic nut may be used in connection with a metal nut, or used independently, as found desirable, and the nut may be of any suitable shape, having four or more sides, or round, to suit the purpose for which it is intended.

Having now fully described my invention, what I claim as new, and desire to secure by Letters Patent, is—

An improvement in elastic nuts consisting of a nut having the bolt-hole of the form described and shown in Fig. 2 of the drawings, and for the purpose specified.

In testimony that I claim the above I have hereunto subscribed my name in the presence of two witnesses.

ABRAHAM T. HUFF.

Witnesses:
W. E. OAKEY,
JOHN N. VAN LIEW.